Nov. 1, 1966  W. W. MERRIMAN  3,282,376
MOBILE PLATFORM
Filed Dec. 28, 1964  2 Sheets-Sheet 1

INVENTOR.
WILLIAM W. MERRIMAN
BY
Woodhams, Blanchard & Flynn
ATTORNEYS

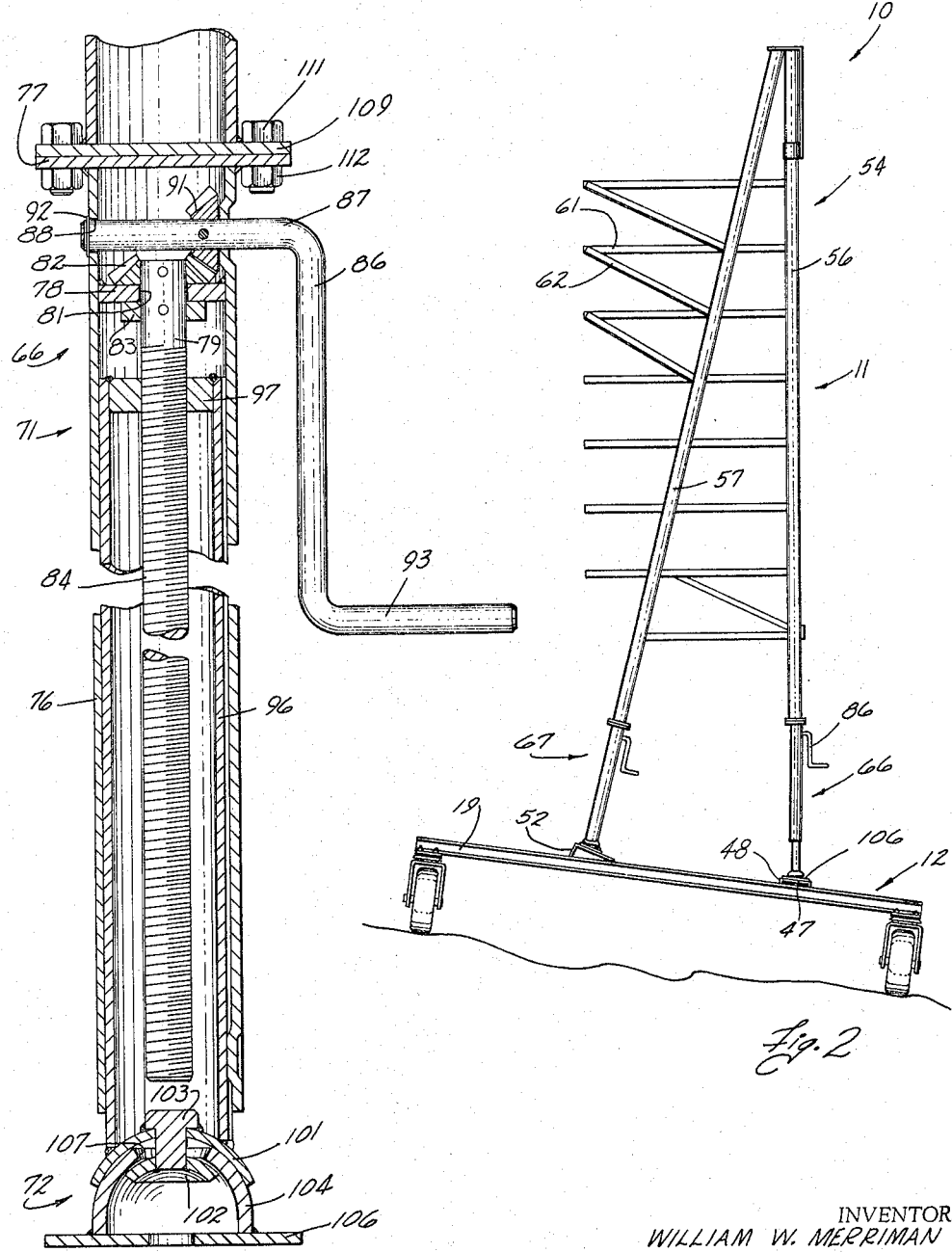

United States Patent Office 3,282,376
Patented Nov. 1, 1966

3,282,376
MOBILE PLATFORM
William W. Merriman, 1942 Oakland Drive,
Kalamazoo, Mich.
Filed Dec. 28, 1964, Ser. No. 421,481
6 Claims. (Cl. 182—17)

This invention relates to a mobile, elevated platform construction including means for leveling said platform and, more particularly, relates to an elevated harvesting platform support including a mobile chassis supporting a framework having pivotally mounted, extensible legs.

Although the platform construction embodying the invention was developed to fill a need in the fruit harvesting industry and will be referred to hereinbelow in terms of use in a fruit orchard, it is fully contemplated such construction could be readily used in other applications requiring a mobile support capable of maintaining a platform level and elevated above sloping ground.

There has long been a need in the harvesting of tree borne fruit for a mobile platform construction which can be readily moved to and from an orchard and from tree to tree within the orchard and which is capable of providing a level platform for supporting personnel at a convenient height for picking. It has also then found desirable that the platform be adjustable in height to adapt the construction to orchards having trees of different heights or trees having a relatively tall fruit-bearing zone.

Provision of such a platform construction is complicated by the fact that orchards often are not set on level ground. It is common practice to plant modern orchards on land which may slope at an angle of up to, but generally not more than, about 12°. In older, established orchards the land may be sloped at somewhat larger angles. Thus, in order to be useable in such situations, the platform construction must be capable of maintaining the platform substantially level despite the slope of the ground on which it stands. Moreover, the construction must be arranged so that it will not become unbalanced or overturn while in use on such sloped ground.

Further, such a platform construction must be capable of adjusting to a wide variety of platform heights and land slopes quickly and without excessive manual effort or operator skill since such adjustments would normally be made by harvesting personnel. Moreover, to minimize initial cost and future maintenance, such construction must be kept as simple as possible while meeting the above-described needs.

Accordingly, the objects of this invention include:

(1) To provide a construction for furnishing a level platform elevated above a level or sloped ground surface.

(2) To provide a platform construction, as aforesaid, which includes an upstanding frame for supporting the platform and means for maintaining the frame substantially upright on level ground as well as on ground sloped in any direction with respect to the frame and within a relatively wide range of slopes.

(3) To provide a platform construction, as aforesaid which includes a wheeled chassis for enabling the platform construction to be readily moved from place to place with little effort and which the chassis may be locked against further movement when the platform is to be used.

(4) To provide a platform construction, as aforesaid, in which the frame includes substantially upstandng legs and jacking means on the legs for effectively extending or retracting same individually and in which pivot joints are provided on the bottom of each leg for allowing each of the legs to pivot with respect to the chassis and, hence, to be maintained in a predetermined substantially upright position despite variations in the slope of the ground and chassis.

(5) To provide a platform construction, as aforesaid, which is particularly adapted for harvesting orchards and the like and in which the preferred embodiment is particularly intended for use on ground, the slope of which lies within the range of 0° to about15°.

(6) To provide a platform construction, as aforesaid, which is relatively simple and inexpensive in construction, in which the number of structurally complex and relatively expensive subassemblies such as pivot joints or the like are minimized in the interest of low initial cost, minimum maintenance and simplified operation which may be constructed of readily available material and parts, which can be made sufficiently sturdy as to provide a relatively long and substantailly maintenance free service life and which is readily maintainable by relatively unskilled personnel.

(7) To provide a construction, as aforesaid, which maintains the platform in a highly stable condition and which cannot be overturned in normal use, in the which the platform height and inclination of the frame with respect to the ground can be readily and quickly adjusted by harvest workers normally unacquainted with devices of this type with little or no training and with a minimum of effort and in which the platform can be arranged in the form of an arc so as to partially surround the tree to be picked.

Further objects and purposes of this invention will be apparent to persons acquainted with apparatus of this general type upon reading the following specification and upon inspecting the accompanying drawings.

In the drawings:

FIGURE 2 is an end elevational view of the construction of FIGURE 1 showing same adjusted for use on ground sloped transversely thereto.

FIGURE 4 is an enlarged fragmentary central cross-sectional view of one of the elevating units of the platform construction of FIGURE 1.

Figure 1:
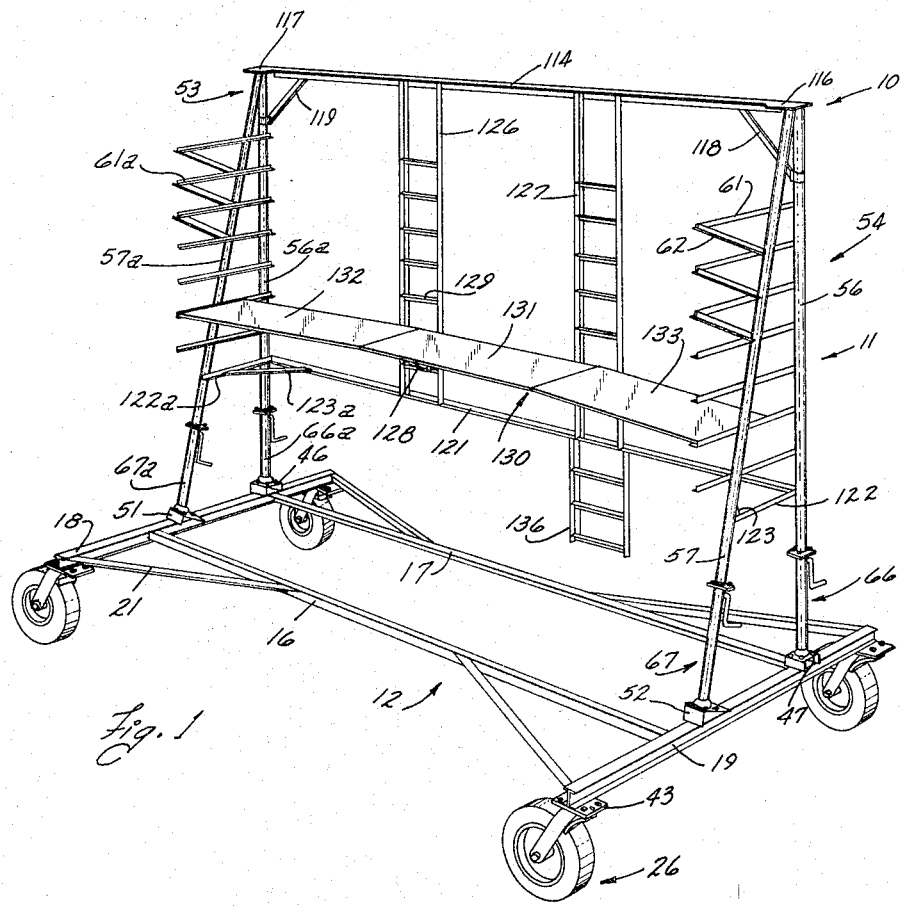
FIGURE 1 is a perspective view of a platform construction embodying the invention.

Certain terminology will be used in the following description for convenience in reference only and will not be limiting. The words "upwardly," "downwardly," "rightwardly" and "leftwardly" will designate directions in the drawings to which reference is made. The words "inwardly" and "outwardly" will refer to direction toward and away from the geometric center of the device and designated parts thereof. Said terminology will include the words above specifically mentioned, derivatives thereof and words of similar import.

General description

In general, the objects and purposes of the invention are met by providing an elevated platform construction including a ground engaging chassis and a normally upright frame including a plurality of substantially upstanding legs secured at spaced points to the chassis by universal joints. Each leg has associated therewith an extensible jack for effectively lengthening or shortening said leg. The frame includes brackets for supporting a normally level platform at any of several vertically spaced locations thereon. The chassis is preferably provided with wheels for allowing the platform construction to be moved from place to place. Manipulation of the jacks to extend or retract selected ones of the legs causes the frame to pivot around the universal joints securing same to the chassis. In this manner, the frame can be moved into an upright condition for leveling the platform even though the chassis is sloped due to slope of the ground.

*Detailed description*

Figure 3:
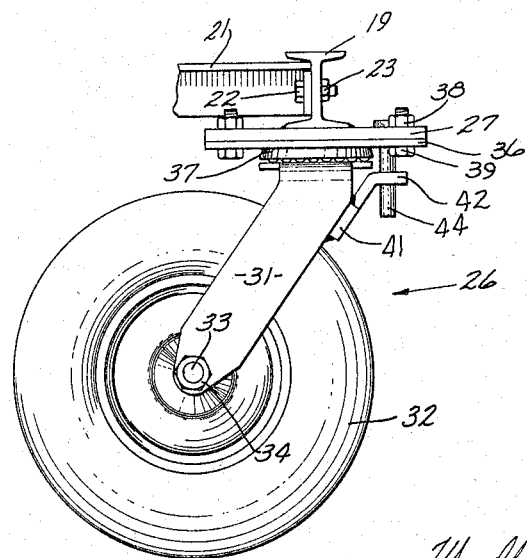
FIGURE 3 is an enlarged fragmentary view of the apparatus of FIGURE 1 showing one of the caster units thereof.

The platform construction 10 (FIGURES 1 and 2) includes a substantially upstanding frame 11 which is mounted upon a ground engaging chassis 12. The chassis 12 includes, in the particular embodiment shown, a spaced, parallel pair of side members 16 and 17 the ends of which are fixed intermediate the ends of a parallel pair of end members 18 and 19. Chassis braces, one of which is indicated at 21, extend angularly inwardly from each of the ends of the end members 18 and 19 to corresponding intermediate points on the side members 16 and 17. The end members 18 and 19, side members 16 and 17 and braces 21 may be connected by any convenient means such as nuts and bolts as generally indicated in FIGURE 3 with respect to the bolt 22 and nut 23. The members 16–19 and braces 21 may be of any convenient configuration and in the particular embodiment shown, the end members 18 and 19 are I beams and the side members and braces are angle beams.

Preferably identical caster units 26 (FIGURES 1, 2 and 3) are affixed at each end of the end members 18 and 19 and, hence, are located at each corner of the chassis 12. More specifically, a rectangular mounting plate 27 is fixed to the undersides of the end members 18 and 19 at each end thereof by any convenient means, such as by welding, for affixing the caster units 26 thereto. The caster unit 26 includes a downwardly opening and somewhat leftwardly (FIGURE 3) sloping U-shaped fork 31. A wheel 32 located in the fork 31 is rotatable on an axle 33 fixed by nuts 34 to the lower ends of said fork. The upper end of the fork 31 is swively secured to a bearing plate 36, preferably by means of a ball bearing connection 37 of any convenient type, for rotation about an axis normal to the plate 36. The bearing plate 36 is secured to the mounting plate 37 by any convenient means such as the nuts 38 and bolts 39. A cross piece 41 extends across the legs of the fork 31 near the upper, bight end thereof and is secured thereto preferably by welding for strengthening the fork. The members 16–19 and 21 thus define a substantially planar chassis structure supported substantially in parallelism with the ground by the caster units 26.

In at least two of the caster units 26, the cross piece 41 preferably includes a substantially horizontally extending extension 42 which lies beneath the mounting plate 27. Suitable alignable holes one of which is shown at 43 (FIGURE 1) are preferably provided in the mounting plate 27 and extension 42 for reception therethrough of a stop pin 44 (FIGURE 3) by means of which the caster unit 26 may be locked in a particular position with respect to the chassis 12. Said holes in the plate 27 and extension 42 are preferably positioned in such manner that the corresponding wheels 32 can be locked at an acute angle to each other to prevent the construction 10 from rolling. The pins 44 may be removed when it is desired to roll the construction 10 from one location to another.

Substantially rectangular base plates 46 and 47 (FIGURES 1 and 2) of inverted U-shaped section include a bight portion supported slightly above and in parallelism with the upper surface of the end members 18 and 19 by downturned legs 48, which legs are affixed, preferably by welding, to said end members. The base plates 46 and 47 are preferably located intermediate the ends of the members 18 and 19 at points spaced from the center thereof and, in the particular embodiment shown, are aligned with the side member 17. Further, base plates 51 and 52, which are substantially L-shaped in cross-section, are secured, preferably by welding, to the upper surfaces of the end members 18 and 19, respectively, to provide mounting surfaces which slope gradually downwardly toward the base plates 46 and 47, respectively. The base plates 51 and 52 are evenly spaced from the base plates 46 and 47 and, in the particular embodiment shown, lie closely adjacent and inward of the side member 16.

The frame 11 comprises a pair of upstanding end units 53 and 54 which extend upwardly from the end members 18 and 19, respectively. The end units 53 and 54 are substantially identical and, hence, only the end unit 54 will be described. Corresponding parts of the end unit 53 being referred to by the same reference numerals thereas with the suffix "a" added. In the particular embodiment shown, the frame end unit 54 includes a normally upright leg 56 and a normally sloped leg 57 the upper ends of which are connected to define a small angle therebetween which in the particular embodiment shown is approximately 15°. The legs 56 and 57 are preferably tubular members.

A plurality of evenly vertically spaced, normally horizontal platform support brackets 61 are affixed, preferably by welding, to the inner surfaces of the legs 56 and 57 and extend past the sloped leg 57 in a cantilevered fashion. The brackets 61 are of angle cross-section, each having an upwardly extending flange and an inwardly extending flange. The uppermost several, here three, of the brackets 61 are provided with angle brackets 62 welded to the sloped legs 57 to assist in supporting the outermost ends thereof. The lowermost one of the brackets 61 is preferably spaced well above the lower ends of the legs 56 and 57. The brackets 61 function to stiffen the upper portion of the end unit 54 as well as to support the ends of the platform hereinafter described.

The legs 56 and 57 are provided at the lower ends thereof with elevating units 66 and 67, respectively, which extend axially downwardly therefrom. The units 66 and 67 are preferably identical and, hence, a description of the unit 66, will suffice for both.

The unit 66 (FIGURES 1 and 4) includes a jack, here a screw type jack 71, to the lower end of which is affixed a pivot point 72 of the ball and socket type. The jack 71 includes a substantially cylindrical outer tube 76 having a radial flange 77 secured by welding to the upper end thereof. An annular bulkhead 78 is coaxially fixed within the outer tube 76 by any convenient means, such as by welding, at a location spaced below the flange 77. An elongated screw shaft 79 is snugly but rotatably received through the central opening 81 of the annular bulkhead 78. The upper end of the screw shaft 79 extends above the bulkhead 78 and a bevel gear 82 is affixed thereto, as by pinning, for rotation therewith. A collar 83 is affixed to the screw shaft 79 below the bulkhead 78 by any convenient means such as a pin. The collar 83 and bevel gear 82 sandwich the bulkhead 78 therebetween to locate the shaft 79 axially of the outer tube 76. The screw shaft 79 is threaded below the collar 83 as indicated at 84 and extends nearly to the lower end of the outer tube 76 in coaxial alignment therewith.

A generally Z-shaped crank 86 has an end 87 which snugly but rotably extends through diametral openings 88 in the outer tube 76 above the gear 82. The end 87 supports a further bevel gear 91 which is pinned thereto for rotation therewith. The gear 91 is in driving engagement with the bevel gear 82. A lock ring 92 retains the crank 86 in place. The other end 93 of the crank 86 serves as a manually actuable handle for rotating the bevel gear 91 and hence the screw shaft 79.

An inner tube 96 is snugly but axially slideably disposed within the outer tube 76 below the bulkhead 78. An internally threaded nut 97 is affixed coaxially to the upper end of the inner tube 96, preferably by welding and threadably receives the threaded portion 84 of the screw shaft 79. Thus, rotation of the screw shaft 79 causes axial movement of the outer tube 76 with respect to the inner tube 96.

The pivot joint 72 in the particular embodiment shown comprises a coaxially disposed, substantially concentric pair of spaced partially spherical shells 101 and 102 disposed on opposite sides of an intermediate shell 104. The radially outer surface of the shell 101 is affixed, here by welding, to the lower end of the inner cylinder 96 in coaxial alignment therewith. A coaxial pin 103 extends between the shells 101 and 102 and is secured thereto by welding to maintain said shells in fixed relationship to each other. The edge of the intermediate, substantially hemispherical shell 104 is supported upon a plate 106 and secured thereto by any convenient means, such as by welding. The internal and external radii of the intermediate shell are preferably substantially equal to the external radius of the inner shell and the internal radius of the outer shell respectively. The intermediate shell 104 has a coaxial opening 107 which is larger in diameter than the diameter of the pin 103 and is smaller than the width of the inner shell 102 whereby with the intermediate shell 104 being disposed between the shells 101 and 102 with the pin 103 extending through the opening 107 in the intermediate shell 104, said intermediate shell is snugly but slideably disposed between the shells 101 and 102 and forms therewith a ball and socket pivot joint. The circumferential extent of the shells 101 and 102 is sufficiently small as to prevent interference thereof with the plate 106 during pivotal motion of the joint 72.

The particular embodiment of the pivot joint 72 shown is a substantially permanent one which may be assembled in any convenient fashion such as by securing the pin 103 to the outer shell 101, sliding the shells 102 and 104 over the pin 103, welding the end of the pin 103 to the shell 102 and finally welding the shell 104 to the plate 106 and welding the shell 101 to the inner tube 96.

The interior of the inner tube 96 is preferably filled with lubricant for lubricating the screw threads 84 and nut 97. In a similar manner, lubricant is preferably introduced into the portion of the outer tube 76 adjacent the upper end of the shaft 79. If desired, the pin 103 or outer shell 101 may be provided with small passages therethrough for lubricating the joint 72 from the lubricant supply in the inner tube 96.

The lower end of the leg 56 is in the present embodiment equipped with a radial flange 109 welded thereto. The flange 77 on the outer tube 76 is attached to the flange 109 by suitable bolts 111 and nuts 112 to secure the elevating unit 66 to the lower end of the leg 56. The lower plate 106 is preferably attached in a similar manner to the corresponding base plate (FIGURES 1 and 2), here the base plate 47, on the chassis 12.

Thus, the leg 56 is substantially rigidly affixed to the upper end of the extension unit 66, the lower end of which is pivotally supported by the base plate 106 on the chassis 12. In a similar manner, the leg 57 of the end unit 54 is affixed by means of the elevating unit 67 pivotally to the base plate 52 on the chassis 12.

The end units 53 and 54 (FIGURE 1) are connected at their upper ends by an upper beam 114 which in the particular embodiment shown includes widened end connecting flanges 116 and 117. Sloped braces 118 and 119 connect between the respective legs 56a and 56 and the upper beam 114 to enhance the rigidity of the frame 11 in the plane of the legs 56 and 56a. A lower beam 121 connects the legs 56 and 56a at points vertically spaced between the lowest brackets 61 and 61a and the extension units. Spacers 122 and 122a extend between the legs of the end units 53 and 54 respectively adjacent the lower beam 121 and are connected thereto by angled braces 123 and 123a to rigidify the frame in the plane thereof. Upstanding ladder-like members 126 and 127 are connected between the beams 114 and 121 and are preferably substantially equally spaced from each other and from the adjacent end units 53 and 54. The ladders 126 and 127 have rungs 129 which are vertically spaced at heights corresponding to the brackets 61 and 61a. Suitable triangular supports of any convenient type, one of which is indicated at 128, are removably mountable on adjacent pairs of rungs 129 on each of the ladders 126 and 127 for alternate use at several vertical locations thereon. A platform 130 includes a center platform member 131, which may be a plank or similar member. The center platform member 131 is supported upon and between the supports 128 of the ladder members 126 and 127 and is preferably affixed thereto for vertical adjustment therewith. The center platform member 131 is preferably substantially parallel to the beam 121. Side platform members 132 and 133 extend from the supports 128 of the respective ladder members 126 and 127 to horizontally aligned ones of the respective brackets 61a and 61 and are preferably removably affixed thereto. A depending ladder extension 136 may be affixed to the beam 121 below the ladders 126 and 127 to assist persons in climbing up to the platform 130. The side platform members 132 and 133 preferably extend away from the plane of the ladder members 126 and 127 as they extend outwardly from the central member 131. Thus, the platform 130 is preferably arcuate for conforming to the perimeter of fruit trees.

*Operation*

The apparatus 10 may be readily moved to a place of use, as to an orchard, or from tree to tree therein by simply rolling same along on the casters 26. In cases where locking pins 44 are provided to hold a pair of the wheels 32 in a non-parallel condition, such pins will normally be removed to enable the construction 10 to be freely rolled. Upon reaching the desired location where, for example, the platform 130 is snugly disposed about the periphery of a tree, the locking pins 44 are reinserted for maintaining at least a pair of the caster units 26 in non-parallel condition for braking the construction 10 against rolling out of position. The chassis 12 will normally be sufficiently flexible and the tires 32 will be of sufficiently great width as to accommodate minor bumps or holes in the surface of the ground so that all four wheels 32 will normally firmly engage the ground to prevent rocking of the construction 10.

With the jacks 66, 67, 66a and 67a being initially retracted, the platform 130 will be parallel to the plane of the chassis 12 and, hence, at least substantially parallel to the ground therebelow. Should the construction 10 be then parked on ground which is sloped, the plane of the chassis 12 will also slope and, hence, the legs 56 and 56a will no longer be upright and platform 130 will not be level. By proper and selective adjustment of said jacks, as hereinafter described, the legs 56 and 56a can be returned to their normal vertical position to level the platform 130. It will be noted that the platform 130 can be leveled above ground which slopes in any direction away therefrom. Thus, the platform 130 may be leveled when the members 18 and 19 slope, when the side members 16 and 17 slope or under a combination of the two conditions. As an example, let it be assumed that the chassis 12 slopes along the end members in one direction as indicated in FIGURE 2 wherein the rightward end of the end member 19 lies below the leftward end thereof. Under such a condition, the legs 56 and 56a may be restored to their upright position shown to level the platform 130 by extending units 66 and 66a until the desired condition is reached. Referring to FIGURE 4, extension of the unit 66 will be seen to be accomplished by rotation of the crank 86 in the proper direction. This rotation causes the bevel gear 91 to rotate the bevel gear 92 and, hence, the shaft 79 thereby causing said shaft to be threaded axially upwardly through the nut 97. The outer cylinder 76 rises with the screw shaft 79 and with respect to the inner cylinder 96 thereby extending the jack. Such extension of the units 66 and 66a pivots the frame 11 about the common axis of the corresponding pivot joints of the extension units 67 and 67a until the platform 130 is leveled. It will be apparent that the extension units 66 and 66a are pivoted about their respective pivot joints as they are extended. To render the legs 56 and 56a perpendicular to the plane of the chassis 12 as when, for example, the construction 10 is returned to level ground, the extension units 66 and 66a are retracted by reversal of the above process.

Leveling of the platform 130 when the chassis 12 slopes along the length of the side members 16 and 17 is handled in an analogous manner by extending the jacking units on the low end of the chassis, i.e., either the units 66 and 67 or the units 66a and 67a.

When the chassis 12 slopes along a line which parallels neither the chassis side or end members, adjustment of the three lowermost jacks is generally made to bring the platform 130 to a level condition. In order to minimize the cranking force required to extend the jacks, particularly when the change in jack extension is relatively great, the jacks to be adjusted are preferably actuated simultaneously or by stages alternatively in order to avoid the frame flexure which might occur if a single jack was adjusted through its full range without corresponding adjustment of the other jacks.

The particular construction 10 shown on the drawings is intended for use in situations where the ground slope does not materially exceed 15° from the horizontal and has been found to work most satisfactorily at least within its afore-mentioned intended limit. As the end unit 54 is rotated, for example, in a clockwise direction as seen in FIGURE 2, about the pivot joint of the elevating unit 67 through a relatively large angle, the fixed location of the pivot joints of the units 66 and 67 on the chassis 12 tends to urge the outer tubes of said units 66 and 67 slightly closer together. Because the leg 56 is normally perpendicular to the plane of the chassis 12 and because the leg 57 deviates from such a perpendicular condition by only a small angular amount, it will be seen that for ground slopes of less than about 15° that the portions of the end frame 54 below the brace 122 including the extension units are capable of flexing through the small required deflection without exceeding its elastic limit and while still being sufficiently rigid as to adequately support the platform 130 when loaded without significant sway or the like. It can be readily shown that for ground slopes with the intended range, deflection of the lower portions of the legs 56 and 57 and extension units 66 and 67 beyond a degree or two is not required. Similarly, any tendency of the lower ends of the end units 53 and 54 to be deflected is correspondingly minor and within the capability of the construction when the jacks 66a and 67a or 66 and 67 are extended to compensate for sloping of the chassis 12 along the axis of the side members 16 and 17.

It is fully contemplated, however, that should it be desired to use the construction 10 under conditions where the slope of the chassis 12 will far exceed the above-described nominal limit of 15°, all or all but one of the pivot joints may be mounted by any convenient means not shown to slide as required during tilting of the frame 11 with respect to the chassis 12. As an alternative, further and lockable pivot joints can be provided adjacent the upper ends of the extension units.

The platform 130 may be adjusted to the desired height by moving the supports 128 with respect to the ladder members 126 and 127 and by moving the panels 131, 132 and 133 to the desired position on the supports 128 and the corresponding brackets 61.

Although a particular preferred embodiment of the invention has been disclosed above for illustrative purposes it will be understood that variations or modifications thereof which lie within the scope of the appended claims are fully contemplated.

The embodiments of the invention in which an exclusive property or privilege is claimed are defined as follows:

1. A mobile elevated platform construction comprising the combination:
   a substantially rectangular chassis and caster means fixed adjacent the corners thereof for allowing movement of said chassis;
   a substantial rigid frame including a longitudinally spaced pair of end units, each of said end units comprising a first normally upright leg and a second sloped leg affixed at its upper end to said upright leg and extending downwardly away therefrom;
   a vertically spaced set of normally horizontal brackets connecting said legs, extending beyond the sloped one of said legs and being spaced above the lower ends of said legs;
   normally horizontal platform means extending between said end units and supported upon corresponding ones of said brackets, said frame including means for connecting said end units and for supporting said platform between said end units;
   an extensible jack substantially rigidly affixed to the lower end of each of said legs and substantially axially aligned therewith;
   a ball and socket joint affixed to the lower end of each of said jacks and rigidly affixed to said chassis;
   whereby adjustment of the length of said jacks and pivotal motion thereof with respect to said chassis allows said platform to be maintained horizontal when said chassis is sloped.

2. The construction defined in claim 1 in which said jacks are manually actuable screw jacks and at least one of said legs and jacks are capable of limited flexure.

3. The construction defined in claim 1 in which said means joining said end units comprises a beam connected to the upper ends of said end units, a further beam connecting said upright legs above said jacks, upstanding ladder means disposed between said beams and spaced from said upright legs; and including
   adjustable supports engageable with said ladder means for supporting the intermediate portion of said platform, said platform being segmented and curved concavely away from said ladder means.

4. The device defined in claim 1 in which each of said caster units comprises fork, a depending wheel rotatably supported thereon and means mounting said fork for swivelling movement about an axis perpendicular to the plane of the chassis and locking means for maintaining said forks of at least a pair of said caster units in a locked position with the wheels thereof in nonparallel relationship to prevent inadvertent movement of said chassis while said platform is in use.

5. The device defined in claim 1 wherein said jacks each comprise:
   an outer axially elongated cylinder affixed at its upper end to one of said legs and coaxial screw means supported for rotation therewithin;
   manually actuable means for rotating said screw means;
   an inner cylinder and a nut affixed to the upper end thereof for threadably receiving said screw means so that rotation of said screw means causes extension and retraction of said inner cylinder with respect to said outer cylinder.

6. The device defined in claim 1 wherein said pivot joints each comprise:
   a substantially concentric and coaxially aligned pair of partially spherical shells, the radially outer one of which is coaxially aligned with and affixed to the corresponding one of said jacks, and fastening means for locating said semi-spherical shells with respect to each other;
   an intermediate hemispherical shell snugly but slideably disposed in substantial concentricity with and between said partially spherical shells and having a central opening therein for loosely receiving said fastening means therethrough;

a mounting plate for mounting said hemispherical shell with respect to said chassis;

whereby motion of said hemispherical shell with respect to said partially spherical shells allows angular deflection of said jack with respect to said chassis.

References Cited by the Examiner

UNITED STATES PATENTS

| | | | |
|---|---|---|---|
| 666,948 | 1/1901 | Weiss | 182—201 |
| 684,451 | 10/1901 | Mowry | 182—111 |
| 901,565 | 10/1908 | Thomson | 182—118 |
| 1,721,670 | 7/1929 | Rickard | 182—17 |
| 2,318,017 | 5/1943 | Schmidt | 182—201 |
| 2,359,583 | 10/1944 | Reiner | 182—132 |
| 2,989,320 | 6/1961 | Pennington | 182—17 |
| 3,007,540 | 11/1961 | Reinhardt | 182—118 |

FOREIGN PATENTS 974,915  10/1950  France.

REINALDO P. MACHADO, *Primary Examiner.*